Patented Oct. 27, 1925.

1,558,701

UNITED STATES PATENT OFFICE.

ERWIN E. A. G. MEYER, OF DETROIT, MICHIGAN, ASSIGNOR TO MORGAN & WRIGHT, OF DETROIT, MICHIGAN, A CORPORATION OF MICHIGAN.

RUBBER COMPOUND AND ITS PROCESS OF MANUFACTURE.

No Drawing.    Application filed March 13, 1925.   Serial No. 15,406.

*To all whom it may concern:*

Be it known that I, ERWIN E. A. G. MEYER, a citizen of the United States, and a resident of Detroit, county of Wayne, State of Michigan, have invented certain new and useful Improvements in Rubber Compounds and Their Processes of Manufacture, of which the following is a full, clear, and exact description.

This invention relates to the manufacture of rubber, and more particularly to rubber compositions and their method of preparation.

Heretofore to obtain desired physical characteristics in a rubber compound for manufacture into tread stocks, for calendering on to fabrics, and for various other purposes incident to the manufacture of finished rubber goods, it has been the practice to employ a lubricating medium such as vegetable or mineral oils or other agents. Such added ingredients, however, are frequently objectionable because they impart undesirable qualities to the finished batch, and/or goods.

It has been discovered that rubber latex may be added to the batch being kneaded, in a mixing machine or on a mill, to great advantage. The plasticity, tackiness, and smoothness of the batch may be controlled and almost any desired degree thereof may be obtained. Long strips of rubber compounded with latex shrink much less on cooling than as heretofore prepared. Scorching or premature vulcanization on mixing mills, warming mills and calenders may be prevented or minimized as the added rubber latex reduces the temperature in the batch being kneaded. Uncured stocks tend to bloom out after cooling or standing for a period of time but by incorporating rubber latex in the batch a permanent tackiness, very desirable for manufacturing reasons, is obtained. By adding rubber latex to batches containing shoddies, the plasticity is enhanced. Accelerators not capable of being milled or otherwise worked into a homogeneous compound by methods heretofore employed may now be added without deleterious scorching or premature vulcanization if a little rubber latex is incorporated in the batch. These are some of the advantages of the invention, others will be apparent to those skilled in the art.

With the preferred embodiment in mind but without intention to limit more than is required by the prior art, the invention, briefly stated, consists in adding rubber latex to a batch of rubber or rubber composition being milled, mixed or otherwise mechanically kneaded or worked to either a desired physical condition and/or a degree of homogeneity.

According to the invention, and taking the preparation of tread stocks for tires as an example, a batch of suitable composition for this purpose may have around 3% of its rubber omitted and replaced by an amount of rubber latex which contains 3% of rubber in suspension. The rubber latex may be added in any suitable and convenient manner, spraying in the early stages of the milling, mixing or working of the batch having been found satisfactory. Of course the manner of and the time occupied in adding the rubber latex may be varied widely to meet the requirements of the materials being mixed or worked, and it is to be understood that the invention is in no wise limited in this respect as such factors may be left to the discretion of the manufacturer.

As an additional example a stock suitable for skim coating fabrics as heretofore compounded may have 1 or 2% of its rubber replaced by an equivalent amount of rubber in the form of latex.

Generally stated the invention contemplates the addition of rubber latex to a mass of rubber or a mass of rubber composition containing vulcanizing ingredients, fillers, and/or accelerators. The quantity of rubber latex added preferably will be small and in substitution for an amount of rubber in the old formula.

The advantages of the invention have already been enumerated. But by way of reiteration, the addition of rubber latex enables (1) the plasticity, tackiness and smoothness of compounds to be controlled, (2) shrinkage of stocks on cooling to be materially reduced—an eleven foot strip of tread stock for instance which heretofore shrunk from 6 to 8 inches now by this invention may be compounded so that it shrinks 2 inches or less—(3) the temperature during kneading or working is reduced thereby preventing scorching and premature vulcanization and also enabling more powerful accelerators to be incorporated by available factory facilities, (4) improves the plasticity of ground shoddies. The improved tackiness of the milled, mixed or otherwise prepared batch is alone a very valuable contribution to the art inasmuch as the compounds (in the form of tread stocks or rubberized plies, etc.) unavoidably stand around for a certain period of time before they are assembled into an article such as tires, hose, belting, etc. Not infrequently heretofore it has been necessary to brush the compounds or coated materials with naphtha or the like before building them into articles, and the present invention eliminates the necessity of such brushing. Moreover the tackiness resulting from the incorporation of the latex is much more desirable than that superficially resulting from brushing with naphtha. But when in addition to this improved tackiness, the many other advantages above enumerated are considered, the importance and practical value of the present invention will be manifest.

It is to be understood that the invention contemplates the addition of rubber latex to either crude rubber alone, or compounded, and in the latter case at any desired time, before, during, or after the addition of compounding ingredients. And it further contemplates such additions of rubber-latex in connection with a masticating process incident to the manufacture of rubber goods such for instance as breaking down, milling, mixing, warming-up, tubing, and the like. In the claims the term rubber latex comprehends not only natural latices, such as rubber, balata and gutta percha, but similar dispersions thereof prepared artificially in various known ways. For instance, 12 parts of silurian shale may be dispersed in water and thereto 100 parts of rubber added and dispersed to form an artificial latex which may be used with advantages approximating those of natural latex although in some stocks the abrasion tests were not quite equal to those obtained when natural latex was employed in mixing on the mill.

This application is a continuation in part of my prior application Serial No. 716,307, filed May 28, 1924.

Having thus described by invention, what I claim and desire to protect by Letters Patent is:

1. That method of compounding unvulcanized rubber which consists in distributively incorporating rubber latex in a batch on the mill.

2. That method of compounding unvulcanized rubber which consists in working a batch to render it uniform and spraying rubber latex on the batch during its working.

3. That method of compounding unvulcanized rubber which consists in milling a batch of unvulcanized rubber composition and adding rubber latex to facilitate the milling.

4. That method of compounding unvulcanized rubber which consists in preparing a batch of unvulcanized rubber composition, incorporating rubber latex therewith to bring the total rubber up to a desired proportion, and working the so-treated batch to the desired physical condition.

5. Previously coagulated and unvulcanized rubber mixed with rubber latex.

6. That method of treating unvulcanized rubber which consists in incorporating rubber latex in unvulcanized rubber or unvulcanized rubber compounds during mastication thereof.

Signed at New York, county and State of New York, this 5th day of March, 1925.

ERWIN E. A. G. MEYER.